US010992665B2

(12) United States Patent
Sunkavally et al.

(10) Patent No.: US 10,992,665 B2
(45) Date of Patent: Apr. 27, 2021

(54) USER AUTHENTICATION USING BIOMETRIC REPRESENTATION OF ONE-TIME PASSCODES

(71) Applicant: RSA Security LLC, Bedford, MA (US)

(72) Inventors: Naveen Sunkavally, Cary, NC (US); Brian Mullins, Burlington, MA (US)

(73) Assignee: RSA Security LLC, Bedford, MA (US)

( * ) Notice: Subject to any disclaimer, the term of this patent is extended or adjusted under 35 U.S.C. 154(b) by 302 days.

(21) Appl. No.: 16/176,070

(22) Filed: Oct. 31, 2018

(65) Prior Publication Data

US 2020/0137052 A1 Apr. 30, 2020

(51) Int. Cl.
*G06F 15/16* (2006.01)
*H04L 29/06* (2006.01)

(52) U.S. Cl.
CPC ...... *H04L 63/0861* (2013.01); *H04L 63/0838* (2013.01)

(58) Field of Classification Search
CPC .. H04L 63/63; H04L 63/0861; H04L 63/0838
USPC .......................................................... 726/7
See application file for complete search history.

(56) References Cited

U.S. PATENT DOCUMENTS

| | | | |
|---|---|---|---|
| 7,773,784 B2 * | 8/2010 | Boult ................ | H04L 9/3234 382/124 |
| 8,838,990 B2 * | 9/2014 | Boult ................ | H04L 9/3231 713/186 |
| 8,862,888 B2 * | 10/2014 | Tolba ................ | H04L 63/18 713/179 |
| 9,912,477 B2 * | 3/2018 | Hoy ................. | H04L 9/3006 |
| 9,913,135 B2 * | 3/2018 | Perold .............. | H04L 9/3226 |
| 10,333,707 B1 * | 6/2019 | Pathak .............. | H04L 63/06 |
| 2007/0174206 A1 * | 7/2007 | Colella ............. | G06Q 30/06 705/64 |
| 2017/0076291 A1 * | 3/2017 | Cairns .............. | G06Q 20/3278 |
| 2018/0108001 A1 * | 4/2018 | Taylor .............. | G06Q 20/206 |

OTHER PUBLICATIONS

Reinhold, "The Diceware Passphrase Home Page," http://world.std.com/~reinhold/diceware.html, first published on usenet's sci.crypt. research on Aug. 1, 1995.
E.Ocean, "Protect Accounts from Compromise, Verify Users in Real Time by Sending a One-time Verification Code via Voice," http://eocean.pk, 2018.

* cited by examiner

*Primary Examiner* — Amare F Tabor
(74) *Attorney, Agent, or Firm* — Danielson Legal LLC (57) ABSTRACT

User authentication techniques are provided using biometric representations of one-time passcodes. An exemplary method comprises initiating a challenge to a user in connection with an authentication request by the user to access a protected resource, wherein the challenge comprises a biometric encoding of a one-time passcode using a dictionary; processing a biometric representation by the user in response to the challenge in accordance with the biometric encoding and wherein the processing comprises determining a likelihood that the biometric representation by the user in response to the challenge matches the biometric encoding in the challenge; and resolving the authentication request based on the likelihood. The biometric encoding comprises, for example, a vocal passphrase and/or instructions for the user to perform a specified manipulation to a biometric sample of the user.

15 Claims, 8 Drawing Sheets

USER AUTHENTICATION USING BIOMETRIC REPRESENTATION OF ONE-TIME PASSCODES

FIELD

The field relates generally to information processing systems, and more particularly to authentication techniques in such systems.

BACKGROUND

In order to gain access to applications or other resources via a computer or another user device, users are often required to authenticate themselves by entering authentication information. Such authentication information may comprise, for example, one-time passwords (OTPs) that are generated by a security token carried by a user, such as the RSA SecurID® user authentication token, commercially available from RSA Security LLC of Bedford, Mass., U.S.A.

OTPs are often used as a secondary factor for strong authentication. Current OTPs, such as those generated by the RSA SecurID® security token, are represented as numeric codes. These numeric codes are modeled after passwords and are typically entered by users in a manner similar to passwords (for example, using a physical or touch-screen keyboard or keypad).

A need exists for techniques for processing additional representations of OTPs that may be employed, for example, when a keyboard or keypad is not available, or is not a convenient method for entering an OTP.

SUMMARY

In one embodiment, a method comprises initiating a challenge to a user in connection with an authentication request by the user to access a protected resource, wherein the challenge comprises a biometric encoding of a one-time passcode using a dictionary; processing a biometric representation by the user in response to the challenge in accordance with the biometric encoding and wherein the processing comprises determining a likelihood that the biometric representation by the user in response to the challenge matches the biometric encoding in the challenge; and resolving the authentication request based on the likelihood.

In some embodiments, the one-time passcode comprises a plurality of bits and the biometric encoding comprises a vocal passphrase and/or instructions for the user to perform a specified manipulation to a biometric sample of the user. The specified manipulation comprises applying, for example, specified filters, specified manual markings and/or specified virtual overlays to one or more specified portions of the biometric sample of the user.

Other illustrative embodiments include, without limitation, apparatus, systems, methods and computer program products comprising processor-readable storage media.

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for authenticating a user using a biometric representation of an OTP.

In one or more embodiments, techniques are provided for processing non-numeric representations of OTPs. The disclosed biometric representations of OTPs are well suited, for example, for situations when biometric authentication is used as a primary authentication method and OTPs are used as a secondary factor for strong authentication. While one or more exemplary embodiments are illustrated using voice and faceprint authentication methods, the disclosed biometric OTP techniques can be readily extended to other biometric authentication methods, as would be apparent to a person of ordinary skill in the art. Among other benefits, the disclosed biometric OTP techniques exhibit, relative to traditional OTP techniques, improved better usability, improved code strength, and additional protection to users from replay attacks using their biometric data, as discussed further below.

One or more aspects of the disclosure recognize that for applications that require or support voice authentication, for example, it makes sense for users to submit OTPs using their voice. An n-digit numeric code, however, is not the best way for a user to submit his or her OTP. It has been found that an n-digit numeric code may be clunky and hard for a user to recall quickly. Further, the more words that a user needs to speak when submitting an OTP, the greater the likelihood that the authentication system can misunderstand what the user has said.

Thus, in some embodiments, an OTP comprising a plurality of bits is encoded using a dictionary-based biometric encoding that translates the OTP into a corresponding vocal passphrase. In a further variation, an OTP comprising a plurality of bits is encoded using a dictionary-based biometric encoding that translates the OTP into a series of instructions to have the user perform a specified manipulation to a biometric sample of the user. For example, the specified manipulation can comprise applying specified filters, specified manual markings, and/or specified virtual overlays to one or more specified portions of the biometric sample of the user. In various embodiments, the biometric sample of the user may be, for example, a faceprint, an eye print, an ear print, a hand geometry, a vein image or a voice print.

In response to a challenge comprising a biometric encoding of an OTP, a user submits a response comprising such a biometric representation of the biometric encoding of the OTP and an authentication decision is made by determining a likelihood that the biometric representation of the OTP matches the biometric encoding in the original OTP.

Assuming that existing OTP codes are represented as n numeric digits, then the number of possible codes is $10^n$, which requires about $3.322*n$ bits to encode. Eight digit codes, for example, have about 27 bits worth of entropy. It can be shown that the disclosed biometric OTP techniques provide similar, if not better, entropy.

Figure 1:
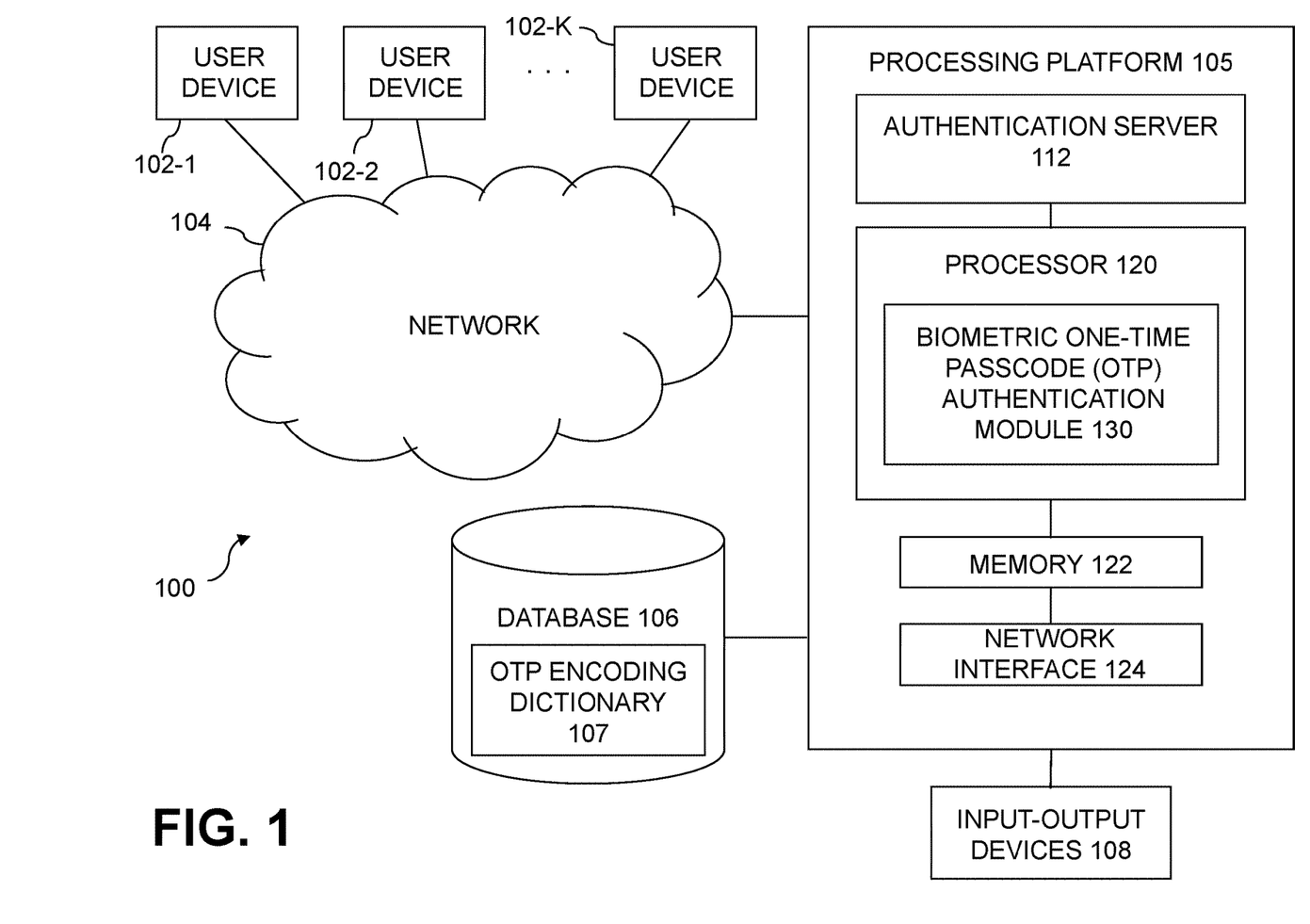
FIG. 1 shows an information processing system configured for generating and processing biometric representations of OTPs in one embodiment of the disclosure.

FIG. 1 shows a computer network 100 configured in accordance with an illustrative embodiment of the disclosure. The computer network 100 comprises a plurality of user devices 102-1, 102-2, . . . 102-K, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to the network 104 is a processing platform 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

The processing platform 105 has an associated database 106 configured to store an OTP encoding dictionary 107 that is used to encode a traditional OTP into an encoded biometric representation of the traditional OTP, as discussed further below in conjunction with FIG. 6.

As noted above, in some embodiments, an OTP comprising a plurality of bits is encoded using a dictionary-based biometric encoding that translates the OTP into (i) a corresponding vocal passphrase; or (ii) a series of instructions for the user to perform a specified manipulation to a biometric sample of the user. Thus, the OTP encoding dictionary 107 may comprise multiple dictionaries corresponding to the vocal passphrase and biometric sample manipulation implementations.

The database 106 in the present embodiment is implemented using one or more storage systems associated with the processing platform 105. Such storage systems can comprise any of a variety of different types of storage including, for example, network-attached storage (NAS), storage area networks (SANs), direct-attached storage (DAS) and distributed DAS, as well as combinations of these and other storage types, including software-defined storage.

Also associated with processing platform 105 are input-output devices 108, which illustratively comprise keyboards, displays or other types of input-output devices in any combination. Such input-output devices are used to support one or more user interfaces to the processing platform 105, as well as to support communication between the processing platform 105 and other related systems and devices not explicitly shown.

Figure 2:
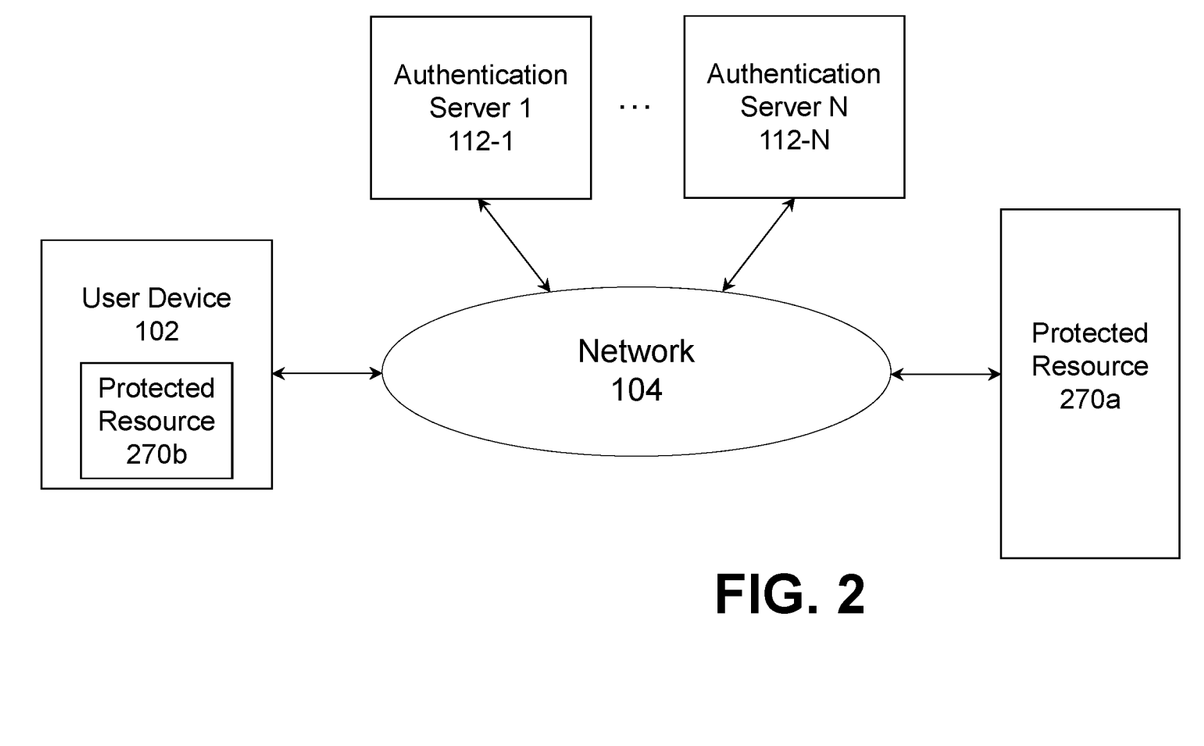
FIG. 2 shows another information processing system configured for generating and processing biometric representations of OTPs in at least one embodiment of the disclosure.

In one or more embodiments of the disclosure (such as the example embodiment depicted in FIG. 1), the processing platform 105 comprises an authentication server 112. Authentication events, such as a challenge comprising a biometric encoding of an OTP, initiated at respective ones of the user devices 102 are directed to the authentication server 112 over the network 104 for processing. The authentication server 112 can determine if a given access attempt is authentic, based on the determined likelihood of plausibility or matching of the biometric representation from the user in response to the challenge with the biometric encoding in the initial challenge. Upon verification of the presented authentication factors, the authentication server 112 grants the requesting user device 102 access to one or more protected resources of the computer network 100 (such as further depicted in FIG. 2, for example). Although shown as an element of the processing platform 105 in this embodiment, the authentication server 112 in other embodiments (such as depicted in FIG. 2, for example) can be implemented at least in part externally to the processing platform 105, for example, as a stand-alone server, set of servers or other type of authentication system coupled to the network 104.

The processing platform 105 in the FIG. 1 embodiment is assumed to be implemented using at least one processing device. Each such processing device generally comprises at least one processor and an associated memory, and implements one or more functional modules for controlling certain features of the processing platform 105.

More particularly, the processing platform 105 in this embodiment comprises a processor 120 coupled to a memory 122 and a network interface 124.

The processor 120 illustratively comprises a microprocessor, a microcontroller, an application-specific integrated circuit (ASIC), a field-programmable gate array (FPGA) or other type of processing circuitry, as well as portions or combinations of such circuitry elements.

The memory 122 illustratively comprises random access memory (RAM), read-only memory (ROM) or other types of memory, in any combination. The memory 122 and other memories disclosed herein may be viewed as examples of what are more generally referred to as "processor-readable storage media" storing executable computer program code or other types of software programs.

One or more embodiments of the disclosure include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals.

The network interface 124 allows the processing platform 105 to communicate over the network 104 with the user devices 102, and illustratively comprises one or more conventional transceivers.

The processor 120 further comprises a biometric OTP authentication module 130.

It is to be appreciated that this particular arrangement of module 130 illustrated in the processor 120 of the FIG. 1 embodiment is presented by way of example only, and alternative arrangements can be used in other embodiments. For example, the functionality associated with the module 130 in other embodiments can be distributed across multiple processing nodes, or separated across a larger number of modules within processor 120. As another example, multiple distinct processors can be used to implement different ones of the module 130 or portions thereof.

At least portions of the biometric OTP authentication module 130 may be implemented at least in part in the form of software that is stored in memory 122 and executed by processor 120. Similarly, at least portions of the authentication server 112 of the processing platform 105 can be implemented at least in part in the form of software that is stored in memory 122 and executed by processor 120.

It is to be understood that the particular set of elements shown in FIG. 1 for biometric representation of OTPs for use in authentication processes involving user devices 102 of computer network 100 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the processing platform 105 can be eliminated and associated elements such as authentication server 112 and biometric OTP authentication module 130 can be implemented elsewhere in the computer network 100.

An exemplary process utilizing biometric OTP authentication module 130 of the processing platform 105 in computer network 100 will be described in more detail with reference to the flow diagram of FIG. 5.

FIG. 2 is a system diagram of an illustrative embodiment of the disclosure. By way of illustration, FIG. 2 depicts an alternative embodiment to FIG. 1, wherein the authentication server(s) 112 is/are not resident on the processing platform 105 or user device(s) 102, but rather are separate devices. Accordingly, as depicted in FIG. 2, user device 102 communicates with a protected resource 270a over network 104. As detailed further below, at least one embodiment of the disclosure can also include a user device 102 that includes a protected resource 270b residing thereon. In an example implementation, a user authenticates online with one or more authentication servers 112-1 through 112-N (hereinafter, collectively referred to as authentication servers 112) before obtaining access to protected resource 270a and/or 270b (hereinafter, collectively referred to as protected resource 270 unless otherwise specified).

According to one aspect of the disclosure, as noted above, the user of the user device 102 is authenticated by authentication servers 112 using a biometric representation of an OTP, and/or other forms of cryptographic information. The exemplary communications among the system elements 102, 104 and 270 of FIG. 2 employed to achieve authentication by the authentication servers 112 are discussed further below.

It is to be appreciated that a given embodiment of the disclosed system may include multiple instances of user device 102 and protected resource 270, and possibly other system components, although only single instances of such components are shown in the simplified system diagram of FIG. 2 for clarity of illustration.

As noted herein, user device 102 may represent a portable device, such as a mobile telephone, personal digital assistant (PDA), wireless email device, game console, etc. The user device 102 may alternatively represent a desktop or laptop personal computer (PC), a microcomputer, a workstation, a mainframe computer, a wired telephone, a television set top box, or any other information processing device which can benefit from the use of authentication techniques in accordance with the disclosure.

The user device 102 may also be referred to herein as simply a "user." The term "user," as used in this context, should be understood to encompass, by way of example and without limitation, a user device, a person utilizing or otherwise associated with the device, or a combination of both. An operation described herein as being performed by a user may therefore, for example, be performed by a user device, a person utilizing or otherwise associated with the device, or by a combination of both the person and the device. Similarly, a password, OTP, or other cryptographic information described as being associated with a user may, for example, be associated with a user device 102, a person utilizing or otherwise associated with the device, or a combination of both the person and the device.

As also depicted in FIG. 2, the authentication servers 112 can be associated with a third party entity, such as an authentication authority, that processes authentication requests on behalf of web servers and other resources, as well as verifies the cryptographic information that is presented by a user device 102.

Further, the protected resource 270 may be, for example, an access-controlled application, data store, web site or hardware device. In other words, a protected resource 270 is a resource that grants user access responsive to an authentication process, as will be described in greater detail below. For example, protected resource 270a may include an access-controlled file, an e-mail, a protected application, a remote application server such as a web site or other software program or hardware device that is accessed by the user device 102 over a network 104.

Additionally, in at least one embodiment of the disclosure, protected resource 270b can include one or more applications or data residing on the user device 102 itself. For example, such a protected resource 270b can include access to a mobile data management container for launching applications on the user device 102 (such as a mobile device), which can be protected requiring authentication in order to run the application(s) protected by the container. Further, protected resource 270b could also include an access-controlled file, e-mail, protected application, remote application server such as a web site or other software program or hardware device that is accessed by the user device 102 over network 104. Similarly, it is possible that in order to unlock the mobile platform to perform operations, a successful authentication might be required.

Figure 3:
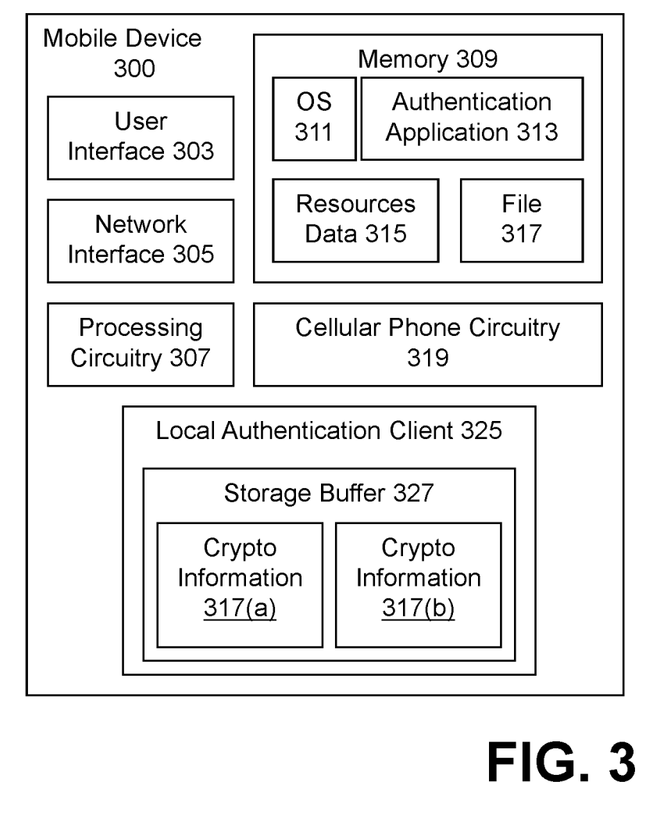
FIG. 3 is a system diagram of an exemplary mobile device on which at least one embodiment of the disclosure can be implemented.

FIG. 3 is a system diagram of an exemplary mobile device 300 on which at least one embodiment of the disclosure can be implemented. By way of illustration, as shown in FIG. 3, the exemplary mobile device 300 comprises a user interface 303 configured to receive user input and provide user output, such as a data file and/or data file location selection(s), such as described herein. One or more embodiments of the disclosure can include components such as a display screen, a capacitive touch display, and a push-button keyboard implemented for use in connection with the user interface 303.

Additionally, the mobile device 300 includes a network interface 305 configured to connect the mobile device 300 to a communications medium such as, for example, Wi-Fi and/or cellular telephony. Accordingly, the network interface 305 enables the mobile device 300 to communicate with the other components of an electronic environment.

The mobile device 300 further comprises a memory 309 configured to store one or more software constructs including, for example, an operating system 311, an authentication application 313, data for protected resources 315 (e.g., documents and restricted applications), a cryptographic information file 317, as well as other suitable or relevant material.

In one or more embodiments, processing circuitry 307 of the mobile device 300 is configured to operate in accordance with the software constructs stored in the memory 309. By way of example, when the processing circuitry 307 runs the operating system 311, the processing circuitry 307 provides a secure electronic platform on which a user is able to carry out work. Such an electronic platform is capable of operating, for example, as a container to protect data requiring user authentication before permitting access. Further, when the processing circuitry 307 runs the authentication application 313, the processing circuitry 307 communicates with a local authentication client 325 in a secure manner, for example, to obtain cryptographic information 317(a), 317(b) from a storage buffer 327, as additionally described herein.

Additionally, for completeness, cellular phone circuitry 319 within mobile device 300 allows the user to establish cellular phone calls with other callers having remote devices, as would be appreciated by one skilled in the art.

It should be appreciated that the processing circuitry 307 can include one or more processors running specialized software components, such as detailed in connection with the techniques detailed herein and further depicted in FIG. 4.

In at least one embodiment of the disclosure, once the mobile device 300 is able to obtain valid cryptographic information, the user of the mobile device 300 is able to perform local user authentication to access protected resources. Accordingly, as noted, the mobile device 300 is provisioned with the authentication application 313 and cryptographic information file 317 holding cryptographic information to be used in connection with an authentication process. For example, and as further detailed herein, such cryptographic information within cryptographic information file 317 can include one or more security tokens for generating OTPs that can be represented using biometric OTPs in some embodiments.

Consequently, the processing circuitry 307 of the mobile device 300 can perform a local authentication operation using cryptographic information file 317 stored in the memory 309. In at least one embodiment of the disclosure the processing circuitry 307 runs the authentication application 313, which directs the user of the mobile device 300, via the user interface 303, to enter cryptographic information (such as, for example, a biometric representation of an original OTP) which is captured as one or more input elements 317(a), 317(b), etc. While the captured cryptographic information 317(a), 317(b), etc. are temporarily stored in the storage buffer 327 of the local authentication client 325, the authentication application 313 compares the captured user-provided cryptographic information 317(a), 317(b), etc. with the original OTP in file 317 to determine a likelihood of a match and/or plausibility of the user-provided biometric representation of the original OTP.

If a match or otherwise positive resolution is determined via this comparison, the authentication application 313 permits the user to access a protected resource (such as, for example, data in association with element 315 that are stored in the memory 309).

Figure 4:
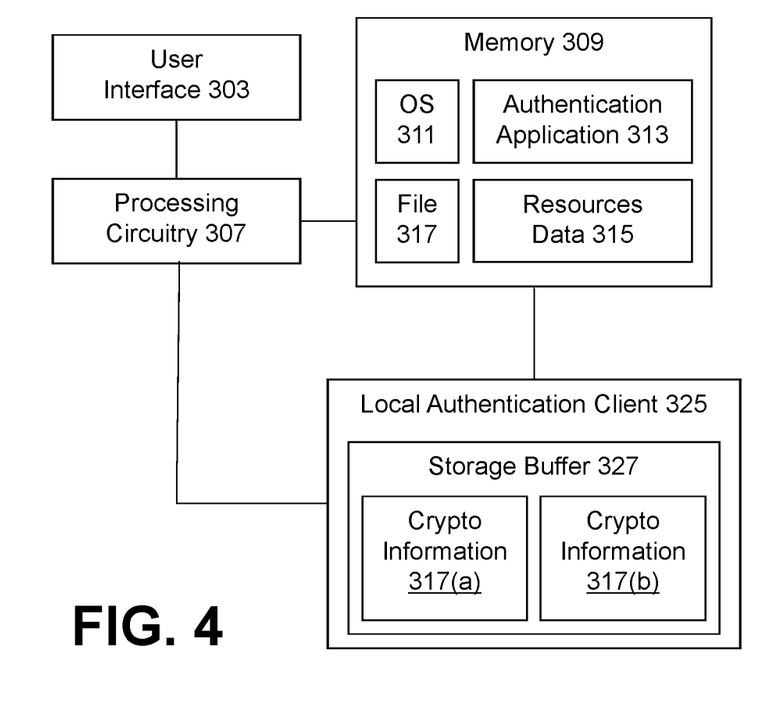
FIG. 4 is a system diagram of exemplary mobile device components, in accordance with at least one embodiment of the disclosure.

FIG. 4 is a system diagram of exemplary mobile device components, in accordance with at least one embodiment of the disclosure. As depicted in FIG. 4, a user can enter cryptographic information via user interface 303. This entered cryptographic information is captured as one or more input elements 317(a), 317(b). Such input elements can include, as noted above, the user-provided biometric representation of the original OTP.

Accordingly, the captured one or more input elements 317(a), 317(b), etc. can be stored in cryptographic information file 317 to be subsequently used in conjunction with fuzzy logic to carry out an authentication process.

Consequently, a corresponding cryptographic flow (carried out, for example, by authentication application 313 as run by operating system 311) can take the following exemplary form. The user is prompted (via user interface 303) as part of a challenge to enter cryptographic information (such as a biometric representation of an original OTP) in connection with an authentication request to access a protected resource associated with the mobile device (for example, the user wishes to access and/or unlock his or her smart phone). The entered cryptographic information is captured by the processing circuitry 307 as one or more input elements 317(a), 317(b) that are temporarily stored in the storage buffer 327 of the local authentication client 325.

Subsequently, the authentication application 313 compares the captured user-provided cryptographic information 317(a), 317(b), etc. with the original challenge in file 317 stored in memory 309 to determine a likelihood of a match and/or plausibility of the user-provided response(s). If the user-entered input elements 317(a), 317(b) are deemed to be matching and/or plausible, authentication is deemed successful and the user is granted access to the protected resource in question.

As noted above, in one or more embodiments, an OTP comprising a plurality of bits is encoded using a dictionary-based biometric encoding that translates the OTP into (i) a corresponding vocal passphrase; or (ii) a series of instructions for the user to perform a specified manipulation to a biometric sample of the user. In various embodiments, the biometric sample of the user may be, for example, a faceprint, an eye print, an ear print, a hand geometry, a vein image or a voice print.

In response to a challenge comprising a biometric encoding of an OTP, a user submits a response comprising a biometric representation by the user of the challenge and an authentication decision is made by determining a likelihood that the biometric representation by the user submitted in response to the challenge matches the biometric encoding in the challenge.

Figure 5:
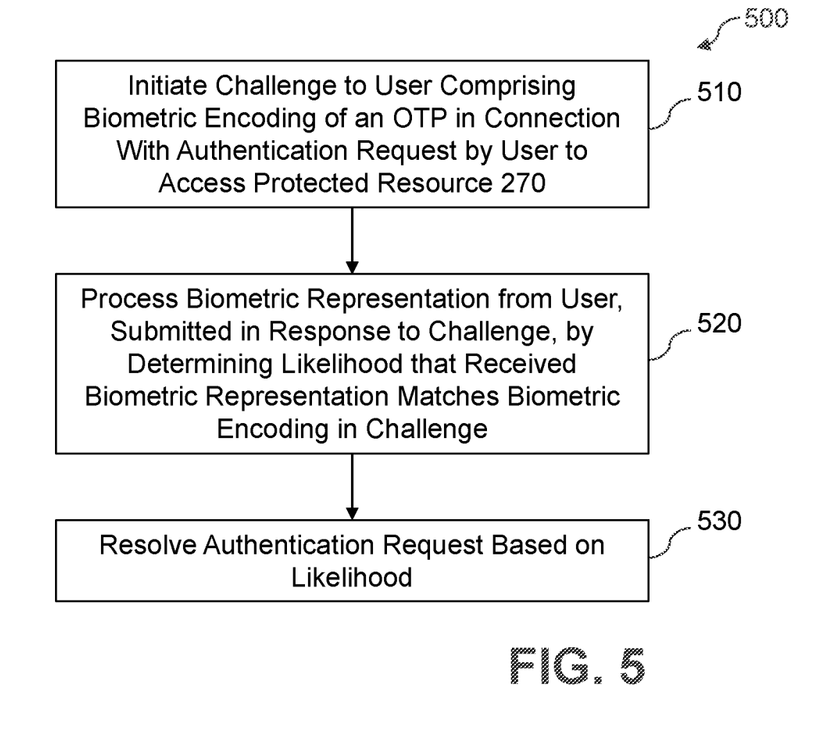
FIG. 5 is a flow diagram of a user authentication process for processing biometric representations of OTPs for use in authentication processes in one illustrative embodiment.

FIG. 5 is a flow diagram of an exemplary user authentication process 500 for processing biometric representations of OTPs for use in authentication processes in one illustrative embodiment. As shown in FIG. 5, the exemplary user authentication process 500 initiates a challenge to the user during step 510 comprising a biometric encoding of an OTP in connection with an authentication request by the user to access a protected resource 270.

Thereafter, during step 520, the exemplary user authentication process 500 processes the biometric representation of the challenge in accordance with the biometric encoding, submitted by the user in response to the challenge, by determining a likelihood that the received biometric representation matches the biometric encoding in the challenge.

Finally, the authentication request is resolved during step 530 based on likelihood that the received biometric representation matches the biometric encoding in the challenge. For example, the user can be granted access to a protected resource if the degree of matching exceeds a predefined threshold. In attempting to authenticate, the user 102 will submit the biometric representation of the OTP and the biometric OTP authentication module 130 is implemented to determine and/or recognize a match or a likelihood thereof between the user biometric responses and the original OTP.

Generally, the underlying security mechanism of an OTP is a secret that is shared between devices. In the context of the exemplary user authentication process 500, the initiating step performed during step 510 generates the challenge, and the processing step 520 verifies the response. The initiating step 510 and the processing step 520 can be performed by the same device (e.g., authentication server 112 of FIG. 1), in some embodiments, or by a plurality of distributed devices (e.g., authentication servers 112-1 through 112-N of FIG. 2), as would be apparent to a person of ordinary skill in the art Accordingly, the particular processing operations and other network functionality described in conjunction with the flow diagram of FIG. 5 are presented by way of illustrative example only, and should not be construed as limiting the scope of the disclosure in any way. Alternative embodiments can use other types of processing operations to compare biometric representations of OTPs to the original OTP in order to make an authentication decision. For example, the ordering of the process steps may be varied in other embodiments, or certain steps may be performed concurrently with one another rather than serially.

Figure 6:
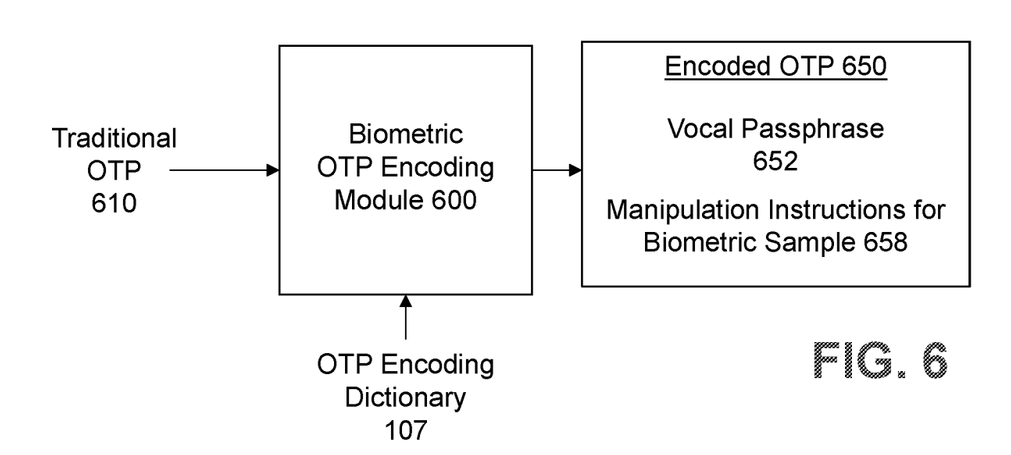
FIG. 6 illustrates an exemplary biometric OTP encoding module, according to one embodiment of the disclosure.

FIG. 6 illustrates an exemplary biometric OTP encoding module 600, according to one embodiment of the disclosure. As shown in FIG. 6, the exemplary biometric OTP encoding module 600 processes a traditional OTP 610, such as those generated by an RSA SecurID® security token.

The exemplary biometric OTP encoding module 600 encodes the traditional OTP 610, using the OTP encoding dictionary 107, into (i) a corresponding vocal passphrase 652; and/or (ii) a series of manipulation instructions 658 for the user to perform specified manipulations to a biometric sample of the user.

Consider the encoding of the traditional OTP 610 into a corresponding vocal passphrase 652 comprising words from the spoken language of the user. Suppose n words are chosen at random from a dictionary of size D. Then, the passphrase has n*log 2(D) bits of entropy.

For the English language, for example, it has been estimated that an average adult knows 20,000 to 35,000 words. Let's suppose D is set to a value of 20,000. Then, just two words yield more than 28 bits of entropy, which is more than an eight digit numeric code used by traditional security tokens, and much easier cognitively for a user.

Alternatively, using a Diceware Passphrase method, which uses a dictionary of 7776 words, three words can achieve more than 38 bits of entropy, significantly stronger than the eight digit numeric code associated with traditional OTPs and still easier cognitively for the end-user.

Concretely, an end-user OTP application such as the RSA SecurID® security token, modified to include the disclosed functions of the present invention, would encode the bit representation of the OTP code into a vocal passphrase 652 and display the vocal passphrase 652 to the user. The authentication backend simply needs to make the same encoding (decoding) transformation (or its inverse) to validate the OTP and authenticate the user.

In the case of a voice-based biometric OTP authentication, users would only need to glance at the OTP application once to remember the passphrase, whereas for an eight digit code, most users would have to look at the application multiple times to remember.

Now consider the encoding of the traditional OTP 610 into a corresponding series of manipulation instructions 658 for the user to perform specified manipulations to a biometric sample of the user. For example, the specified manipulation can comprise applying specified filters (e.g., Snapchat-style filters applied to parts of the image), specified manual markings (e.g., tagging/circling parts of the image), and/or specified virtual overlays (e.g., virtual accessories) to one or more specified portions of the biometric sample of the user. In various embodiments, the biometric sample of the user may be, for example, a faceprint, an eye print, an ear print, a hand geometry, a vein image or a voice print.

For example, the user can be instructed to overlay a set of virtual accessories on top of a face print of the user. In the case of a face print, the OTP application renders the biometric encoding of an OTP as a set of mark-up instructions that describe modifications the user should make to his or her face print. For instance, in the case of virtual accessories, suppose there are n positions on the person's face upon which an accessory can be laid, and each position accepts D accessory types. Then, the OTP application provides n instructions, where each instruction tells the user which accessory to use at a given position. For example, the series of manipulation instructions 658 may comprise the following exemplary instructions: (a) put on a green beret; (b) place a gold stud earring on your right ear; and (c) wear purple square sunglasses.

In the case of encoding a traditional OTP using manipulation instructions 658, the OTP encoding achieves n*log 2(D) bits of entropy. Thus, the disclosed biometric OTP authentication scheme can achieve the same entropy as a traditional eight digit numeric OTP code (27 bits). The OTP encoding dictionary 107 at any given face position can be made larger using different types of accessories combined with different colors, shapes, and patterns. For example, four face positions with 128 possibilities at each position achieves 28 bits of entropy.

An OTP application can show multiple representations of the same OTP simultaneously. For example, the user can be presented with (i) the original eight digit numeric code that the user can use when entering the code using a keyboard or keypad; (ii) the equivalent two or three word vocal passphrase 652 when the user is authenticating using his or her voice; and/or (iii) the series of manipulation instructions 658 for the user to perform specified manipulations to a biometric sample of the user.

In some embodiments, the disclosed biometric OTP techniques exhibit improved usability without sacrificing code quality (e.g., the user can enter OTPs in the more user-friendly forms of vocal passphrases and/or manipulations to biometric samples), improved code strength, and/or additional protection to users from replay attacks using their biometric data. For example, in the case of a face print, the face print of the user alone is not sufficient to obtain access to the protected resource (as might be the case when traditional facial recognition techniques are applied to the face print against the will of the user), as the specified manipulations must also be applied to the face print.

One or more embodiments of the disclosure provide improved methods, apparatus and computer program products for biometric OTP authentication. The foregoing applications and associated embodiments should be considered as illustrative only, and numerous other embodiments can be configured using the techniques disclosed herein, in a wide variety of different applications.

It should also be understood that the disclosed biometric OTP representation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for biometric OTP authentication may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform as a Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based biometric OTP authentication engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based biometric OTP authentication platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
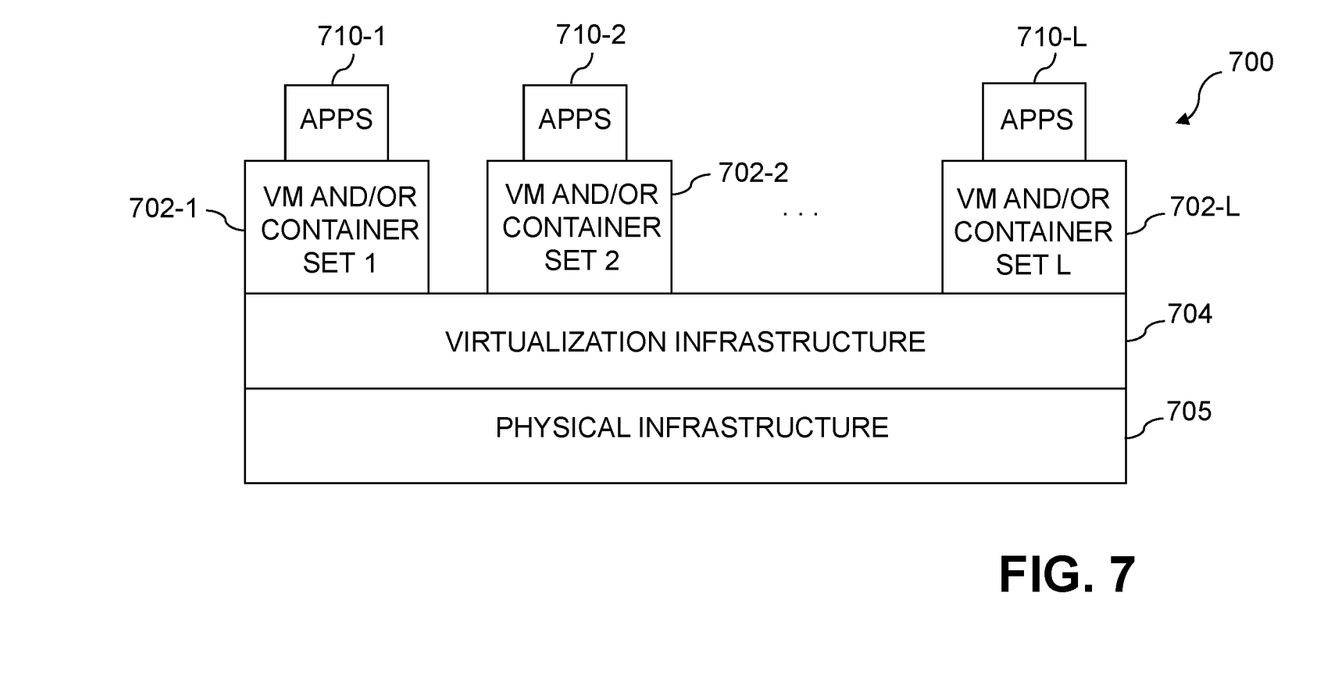
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the disclosed biometric OTP authentication system. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide biometric OTP authentication functionality of the type described above for one or more processes running on a given one of the VMs. For example, each of the VMs can implement biometric OTP authentication control logic and associated biometric encoding techniques for providing biometric OTP authentication functionality for one or more processes running on that particular VM.

An example of a hypervisor platform that may be used to implement a hypervisor within the virtualization infrastructure 704 is the VMware® vSphere® which may have an associated virtual infrastructure management system such as the VMware® vCenter™. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide biometric OTP authentication functionality of the type described above for one or more processes running on different ones of the containers. For example, a container host device supporting multiple containers of one or more container sets can implement one or more instances of biometric OTP authentication control logic and associated biometric OTP encoding dictionaries 107 for use in generating biometric OTPs.

As is apparent from the above, one or more of the processing modules or other components of the authentication server 112 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
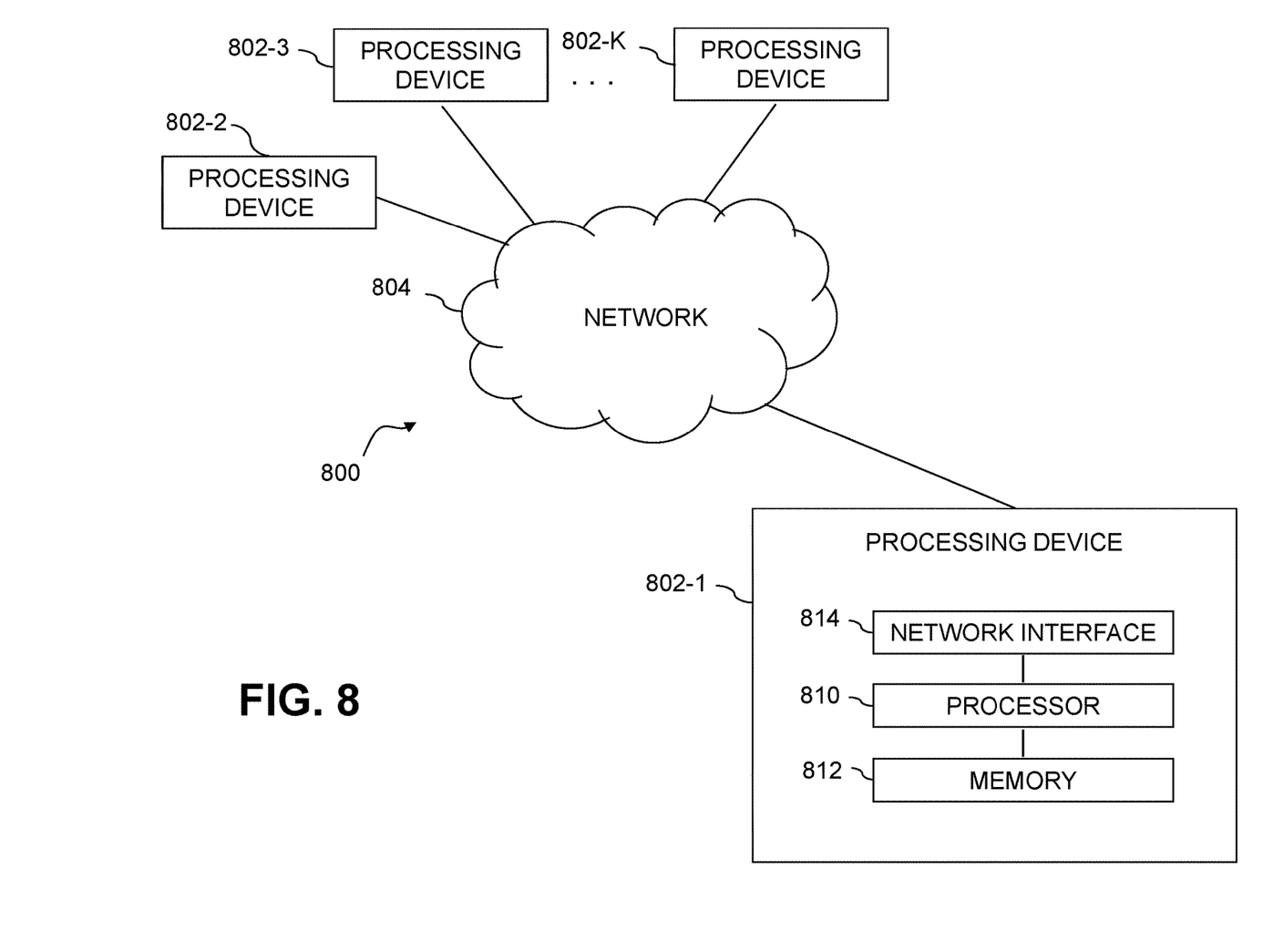
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving an authentication request from a user to access a protected resource;
providing the user with instructions comprising a biometric encoding of a one-time passcode (OTP) using a dictionary-based biometric encoding configured to translate the OTP into at least one of a corresponding vocal passphrase, or a series of the instructions for the user to perform a specified manipulation to a biometric sample of the user, wherein:
the OTP comprises a plurality of bits; and
the specified manipulation comprises applying one or more of specified filters, specified manual markings and specified virtual overlays to one or more specified portions of the biometric sample of the user;
receiving a biometric representation from the user in response to the instructions;
determining that the biometric representation from the user in response to the instructions matches the biometric encoding in the instructions; and
resolving, using at least one processing device, the authentication request based on the match of the biometric representation to the biometric encoding.

2. The method of claim 1, wherein the biometric encoding comprises the corresponding vocal passphrase.

3. The method of claim 1, wherein the specified manipulation comprises applying the one or more specific filters to the one or more specified portions of the biometric sample of the user.

4. The method of claim 1, wherein the specified manipulation comprises applying the one or more specified manual markings to the one or more specified portions of the biometric sample of the user.

5. The method of claim 1, wherein the specified manipulation comprises applying the one or more specified virtual overlays to the one or more specified portions of the biometric sample of the user.

6. The method of claim 1, wherein the biometric sample of the user comprises one or more of a faceprint, an eye print, an ear print, a hand geometry, a vein image and a voice print.

7. The method of claim 1, further comprising the step of performing a biometric evaluation of the biometric representation from the user.

8. The method of claim 1, wherein the biometric encoding employs a user-specific encoding based on a salt value that is unique for the user.

9. The method of claim 1, further comprising the step of presenting the user with a plurality of different biometric encodings of the OTP, wherein the different biometric encodings comprise a plurality of biometric types.

10. A system, comprising:
a memory; and
at least one processing device, coupled to the memory, operative to implement the following steps:
receiving an authentication request from a user to access a protected resource;
providing the user with instructions comprising a biometric encoding of a OTP using a dictionary-based biometric encoding configured to translate the OTP into at least one of a corresponding vocal passphrase, or a series of the instructions for the user to perform a specified manipulation to a biometric sample of the user, wherein:
the OTP comprises a plurality of bits; and
the specified manipulation comprises applying one or more of specified filters, specified manual markings and specified virtual overlays to one or more specified portions of the biometric sample of the user;
receiving a biometric representation from the user in response to the instructions;
determining that the biometric representation from the user in response to the instructions matches the biometric encoding in the instructions; and
resolving the authentication request based on the match of the biometric representation to the biometric encoding.

11. The system of claim 10, wherein the biometric encoding employs a user-specific encoding based on a salt value that is unique for the user.

12. The system of claim 10, further comprising the step of presenting the user with a plurality of different biometric encodings of the OTP, wherein the different biometric encodings comprise a plurality of biometric types.

13. A computer program product, comprising a tangible machine-readable storage medium having encoded therein executable code of one or more software programs, wherein the one or more software programs when executed by at least one processing device perform the following steps:
receiving an authentication request from a user to access a protected resource;
providing the user with instructions comprising a biometric encoding of a OTP using a dictionary-based biometric encoding configured to translate the OTP into at least one of a corresponding vocal passphrase, or a series of the instructions for the user to perform a specified manipulation to a biometric sample of the user, wherein:
the OTP comprises a plurality of bits; and
the specified manipulation comprises applying one or more of specified filters, specified manual markings and specified virtual overlays to one or more specified portions of the biometric sample of the user;
receiving a biometric representation from the user in response to the instructions;
determining that the biometric representation from the user in response to the instructions matches the biometric encoding in the instructions; and
resolving the authentication request based on the match of the biometric representation to the biometric encoding.

14. The computer program product of claim 13, wherein the biometric encoding employs a user-specific encoding based on a salt value that is unique for the user.

15. The computer program product of claim 13, further comprising the step of presenting the user with a plurality of different biometric encodings of the OTP, wherein the different biometric encodings comprise a plurality of biometric types.

* * * * *